Figure 1:
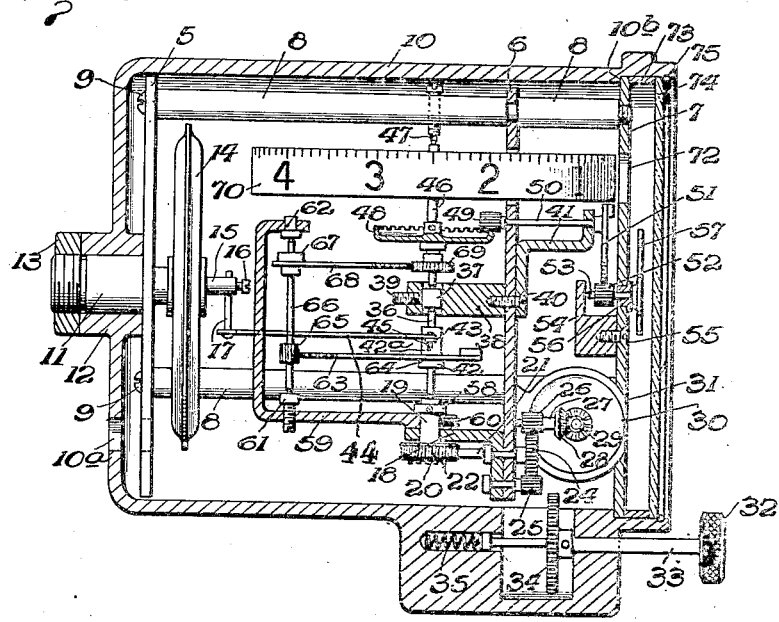

July 23, 1940.  A. MENZER  2,208,728

ALTIMETER

Filed Oct. 14, 1937

INVENTOR
BY *Anton Menzer*
*Stephen Cerstvik* ATTORNEY

Patented July 23, 1940

2,208,728

UNITED STATES PATENT OFFICE 2,208,728

ALTIMETER

Anton Menzer, Brooklyn, N. Y., assignor to Bendix Aviation Corporation, South Bend, Ind., a corporation of Delaware Application October 14, 1937, Serial No. 169,046

4 Claims. (Cl. 73—4)

The present invention relates to improvements in indicating instruments and more particularly to sensitive altimeters and other precision instruments wherein two pointers are utilized.

A sensitive altimeter, as known in the instrument art, is an aircraft instrument employing more than one indicating pointer for indicating the altitude. The first indicator or long pointer makes one complete revolution for each thousand feet or meters. Since the range of a sensitive altimeter is invariably greater than one revolution of the pointer, a second smaller pointer is employed to indicate the number of revolutions made by the long pointer. Thus, while the long pointer makes one revolution for each one thousand feet, the second or small pointer will make one revolution for each ten thousand feet.

Both pointers may use the same scale or set of dial figures in indicating an altitude reading. If the range of the instrument is over ten thousand feet, then a third pointer may be utilized which will indicate the number of revolutions that the second pointer has made.

Since frontal dimensions of aircraft instruments are standardized to a great extent, certain instruments located on an aircraft instrument panel may present a confusing similarity of appearance. This is particularly true of an aircraft clock and the sensitive altimeter described above. Such a clock has a long pointer or minute hand and a shorter pointer or hour hand. The dial thereof, with the exception of the number of numerals thereon, is quite similar in appearance to that of the sensitive altimeter. In making a quick reading of the instrument, only the relative position of the pointers is noted, the exact values of the numerals being ignored. When thusly read, and the occasion for quick reading presents itself, particularly when flying at low altitudes when time is precious, the confusing similarity between the clock and the altimeter can easily lead the pilot to read the wrong instrument, thereby obtaining an erroneous indication of altitude at a time when an accurate indication thereof is most needed.

Accordingly, one of the objects of the present invention is to provide novel means whereby the foregoing undesirable characteristics are eliminated.

A further object is to provide novel means whereby erroneous reading of an instrument may be avoided.

Another object is to provide a novel indicating instrument, comprising an expansible element, a dial, pointer means actuated by said expansible element for movement over said dial, and rotatable annular means actuated by said expansible element in a plane at right angles to said dial.

Still another object is to provide a novel device for indicating a whole part of a quantity to be indicated, means indicating a decimal part of said quantity, one of said means moving in one plane and the other of said means moving in a plane at an angle to said first plane, whereby confusing similarity to other instruments is avoided.

A still further object is to provide a novel indicating instrument comprising an actuating element, a movable pointer connected to said element for rotation in one plane to indicate a measured value, and a rotatable ring rotated by said element in another plane, to indicate the full multiples of said value.

Another object is to provide a novel altimeter comprising an expansible element, pointer means connected to said element for rotation in one plane to indicate the movement of said expansible element according to one ratio, and means actuable by said expansible element in a direction tangential to said plane to indicate the movement of said expansible element according to another ratio.

Still another object is to provide a novel indicating instrument comprising an actuating element, a pointer moving in one plane to indicate the movement of said element according to one ratio, a circular member rotatable in a plane at an angle to said first plane to indicate the movement of said element according to another ratio, and planetary means actuable independently of said expansible element whereby said pointer and annular member may be preset without changing the relative position of said expansible element.

The above and further objects and advantages of the invention will appear more fully hereinafter from a consideration of the detailed description which follows, taken together with the accompanying drawing wherein is illustrated one embodiment of the invention. It is to be expressly understood, however, that the drawing is for the purpose of illustration and description only and is not designed as a definition of the limits of the invention. Reference is to be had for this purpose to the appended claims.

Figure 2:
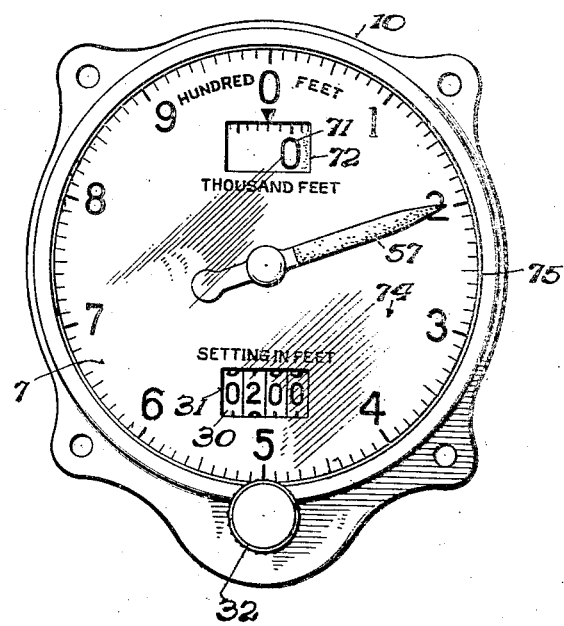

In the drawing, wherein like reference characters refer to like parts throughout the several views;

Fig. 1 is a side elevation, in section, illustrating an embodiment of the invention applied to an altimeter by way of example; and Fig. 2 is a front view of the device shown in Fig. 1.

In the drawing, the present invention is illustrated as applied to a sensitive altimeter although it is to be expressly understood that the invention is not to be so limited but may be applied to any indicating instrument utilizing two or more pointers for indicating a condition of flight in an aircraft.

Referring to the drawing and more particularly to Fig. 1, the operating mechanism is shown as mounted on a frame of any suitable type which, in the present embodiment, comprises a rear frame member or plate 5, a front frame member or plate 6, and a plate 7 forming the dial, said plates and dial being held in spaced relation by spacers 8 and screws 9.

Mounted in casing 10 by means of plate 5 carrying a stub shaft 11 extending into a hollow hub 12 in said casing 10 and locked in place by a nut 13, is an expansible diaphragm assembly 14 which for the sake of simplicity, is shown as a single aneroid capsule. Mounted on center post 15 of said diaphragm and adjustably connected thereto by a screw 16 is a rod 17 which transmits the motion of the expansible diaphragm to the operating mechanism as will be set out more in detail later. Casing 10 is provided with an opening 10a whereby the pressure of the atmosphere is introduced to the outside of diaphragm 14.

Fastened to front plate 6 is an L-shaped bracket 18. On one leg of bracket 18 is journaled the shaft 19 of worm gear 20, while on the other leg is journaled one end of a shaft 21 carrying the worm 22, meshing with the worm gear 20, to the rear thereof, as seen in Fig. 1, the other end of shaft 21 passing through said leg of bracket 18 and carrying integral therewith the gear 24 meshing with pinion 25 and small gear 26. Gear 26 is mounted integrally with shaft 27 journaled in plate 6 and carries at one end thereof bevel pinion 28 meshing with bevel gear 29 to drive a counter 30. Counter 30 consists of a plurality of interconnected drum dials having markings thereon which are visible from the front of the instrument through an opening 31 in dial 7.

Knob 32 integral with shaft 33 carrying gear 34 for meshing with pinion 25 is held in inoperative position by spring 35.

Rockshaft 36 is journaled at one end in shaft 19 and at the other end in bearing 37 held in a block 38 by screw 39. Block 38 is adjustably mounted on plate 6 by screw 40 which also holds the Z-bar 41. Mounted on rockshaft 36 for rotation therewith is collar 42 whose extension 42a carries arm 43 to which is connected at one end thereof the link 44 by pin 45, the other end of said link being connected to rod 17 whereby the movement of the expansible diaphragm 14 is transmitted to rockshaft 36.

Shaft 46, in alignment with shaft 36, is mounted in bearings 37 and 47 and carries for rotation therewith, crown gear 48 meshing with pinion 49 integral with shaft 50 journaled near one end in plate 6 and near the other end in Z-bar 41. Carried at the end of shaft 50 is gear sector 51 meshing with pinion 52 integral with shaft 53 journaled at one end in L-bar 54 fastened to dial 7 by screw 55. The other end of shaft 53 passes through bearing 56 and carries at its end the elongated pointer or sweep hand 57.

Novel means are now provided whereby a planetary system is furnished for presetting both the pointer 57 and a novel indicator in a manner to be set out in more detail hereinafter. Carried by shaft 19 between collar 58 mounted thereon and bracket 18 is the angle arm 59 fastened to shaft 19 by screw 60 whereby said angle arm 59 may be rotated integrally with shaft 19. In opposite legs of the angle arm 59 are mounted the adjustable bearings 61 and 62 in which is journaled part of the novel mechanism comprising the novel indicator of the invention.

The novel indicator means of the present invention comprise a sector 63 mounted for rotation with collar 42 abutting shoulder 64 thereof and meshing with pinion 65 integral with counter-shaft 66 journaled at one end in bearing 61 and at the other end in bearing 62. Mounted integral with counter-shaft 66 for rotation therewith is a collar 67 on which is mounted sector 68 meshing with gear 69 integral with shaft 46 that carries crown gear 48.

Carried at one end of shaft 46 and mounted for rotation therewith is annular member 70 comprising a novel indicator cooperating with the long pointer or sweep hand 57 to give a complete indication of the altitude. Annular member 70 carries numerals 71 thereon, which numerals, upon rotation of member 70, successively appear in opening 72 in dial 7 and are visible in said opening from the front of said instrument.

Plates 5 and 6 and dial 7 carrying the instrument mechanism are slipped into place in casing 10, the dial 7 abutting casing 10 at shoulder 10b and being held in place by spacer ring 73 behind cover glass 74 which is held in place by resilient ring 75.

When it is desired to preset the instrument to the elevation of a landing field toward which the craft upon which the instrument is mounted is proceeding, knob 32 is pushed to the left, as seen in Fig. 1, against the pressure of spring 35 thereby meshing gear 34 with pinion 25. Upon rotation of knob 32 gear 34 rotates pinion 25 to rotate gears 24 and 26 and shaft 27, bevel pinion 28 and bevel gear 29 to rotate counter 30 whereby the desired setting is indicated by counter 30 and appears in opening 31.

Upon rotation of gear 24, worm 22 is simultaneously rotated to drive worm wheel 20 to rotate angle arm 59 whereupon pinion 65 rotates over the sector 63 to rotate shaft 66 whereby sector 68 is rotated to actuate gear 69 and shaft 46 whereupon annular member 70 is rotated. The actuation of shaft 46 also rotates the crown gear 48 to rotate pinion 49, shaft 50, sector 51, pinion 52, shaft 53 and sweep hand 57. The rotation of the sweep hand and the annular member 70 is in such a direction that the indicators will both indicate zero when the craft lands at the landing field toward which it is proceeding. The indication of the instrument while the craft is in flight is therefore an indication of the elevation of the craft above the level of the desired landing place. After setting the indicators, knob 32 is released and assumes the position as shown in Fig. 1.

The operation of the main device is as follows: As the craft carrying the device of the present invention rises from the ground the pressure within the casing 10 is reduced and the diaphragm assembly 14 expands, thereby rotating rockshaft 36 clockwise as viewed from the bottom of the instrument in Fig. 1. This rotation of rockshaft 36 clockwise rotates sector 63 in the same direction to rotate gear 65, shaft 66, collar 67 and sector 68 in counter-clockwise direction. Sector 68 rotates gear 69, shaft 46 and crown gear 48 in a clockwise direction thereby rotating the annular indicating member likewise to indicate the elevation in thousands of feet.

Clockwise rotation of crown gear 48 rotates pinion 49, shaft 50 and sector 51 in a counter-clockwise direction as viewed from the front of the instrument, to thereby rotate pinion 52 and sweep hand 57 to thereby designate the altitude in hundreds of feet which are totalized by annular member 70 whose numerals appear in opening 72 and are read in conjunction with the indication of the pointer or sweep hand 57 to give the complete altitude reading.

By the use of the annular member 70 rotating in a plane at right angles to the plane of rotation of pointer 57, an indication of the altitude is given that cannot be confused with readings of the other instruments in the instrument panel.

Although but one embodiment of the invention has been illustrated and described, further changes may be made. For example, the annular member may be mounted for rotation about an axis at right angles to the plane of the drawing whereby the numerals thereon drop into place in opening 72. Likewise, the annular member may be replaced by a member moving linearly by using a ratchet arrangement to drive the indicating member, the numerals appearing successively in the opening 72 as in the present embodiment.

Other changes and modifications in form, material and relative arrangement of parts, which will now appear to those skilled in the art, may be made without departing from the scope of the invention. Reference is, therefore, to be had to the appended claims for a definition of the limits of the invention.

What is claimed is:

1. In an altimeter, an expansible pressure responsive element, a pointer rotated by said element in one plane to indicate the relative movement of said expansible element according to one ratio, and a drum dial rotatable in another plane at right angles to the first plane and also actuated by said expansible element simultaneously and synchronously with said pointer to indicate relative movement of said element according to a different ratio.

2. In an altimeter, an expansible element, a dial, a pointer mounted for rotation over the face of said dial, a rockshaft, means connecting said rockshaft to said expansible element for actuation thereby, means connecting said pointer to said rockshaft whereby said pointer is moved by said expansive element at a desired ratio with respect to the movement of said element, an annular indicating member mounted for rotation in a plane at right angles to said dial, means connecting said member to said rockshaft for movement of said member at a different ratio than said pointer and window means whereby said member is visible from the face of said altimeter.

3. In an indicating instrument for aircraft, an expansible element, pointer indicating means, a second indicating means, a rockshaft, a shaft in alignment therewith, means leading from said expansible element to said rockshaft for actuation thereof, means connecting said rockshaft and both said indicating means, and planetary means, comprising an arm carried by said aligned shaft and mounted thereon for rotation about the center line of said rockshaft as an axis whereby said connecting means may be actuated to preset said pointer and said second indicating means.

4. In an indicating instrument, an actuating device responsive to a condition to be measured and indicated, a vertical dial having scale means and a window therein, pointer means cooperating with said scale means, an annular number-carrying dial rotatable in a horizontal plane and having a portion visible through the window of said vertical dial, means connecting said pointer means and said annular dial to said actuating device for simultaneous and synchronous actuation thereby in the ratio of one to ten, and means including a planetary gear train for manually actuating said pointer means and annular dial simultaneously in the ratio of one to ten for setting during indicating action.

ANTON MENZER.